United States Patent [19]
Beldock et al.

[11] Patent Number: 5,169,732
[45] Date of Patent: Dec. 8, 1992

[54] SEALED BATTERY WITH INTEGRAL RESERVE CELL AND SWITCH

[75] Inventors: Donald T. Beldock, 50 E. 72nd St., Apt. 13A, New York, N.Y. 10021-4246; Paul P. Craig, Martinez; Frank R. McLarnon, Orinda, both of Calif.

[73] Assignee: Donald T. Beldock, New York, N.Y.

[21] Appl. No.: 649,907

[22] Filed: Feb. 4, 1991

[51] Int. Cl.$^5$ .............................................. H01T 2/34
[52] U.S. Cl. ...................................... 429/150; 429/7; 429/9
[58] Field of Search .......................... 429/7, 9, 48, 150

[56] References Cited

U.S. PATENT DOCUMENTS

| | | | |
|---|---|---|---|
| 2,212,054 | 8/1940 | Spicer | 429/150 |
| 3,029,301 | 4/1962 | Strider | 429/150 X |
| 3,475,221 | 10/1969 | Jordan et al. | 429/9 |

*Primary Examiner*—Stephen Kalafut
*Attorney, Agent, or Firm*—David P. Gordon

[57] ABSTRACT

A sealed battery is provided with a cathode, first and second anodes which are isolated by insulation, first and second current collectors which are separated by the insulation, and an integral switch. The cathode is coupled to a positive terminal of the battery, while the first current collector is coupled to the first anode and to the negative terminal. The second current collector is also coupled to the second terminal via the switch which is easily activated by hand manipulation or by use of a common object such as a ball point pen point. The cathode, first anode, and first current collector provide a large cell. When the large cell is exhausted, as indicated by the failure of the equipment which it is powering to function properly, the reserve cell comprised of the cathode, second anode, and second current collector is readily activated by manipulating the switch. The reserve cell may be smaller than the large cell but provides enough power to properly power the equipment until the batteries can be replaced.

31 Claims, 8 Drawing Sheets

SEALED BATTERY WITH INTEGRAL RESERVE CELL AND SWITCH

BACKGROUND OF THE INVENTION

This invention generally relates to electricity producing apparatus such as batteries. More particularly, this invention relates to batteries having a primary cell and an integral reserve or back-up cell.

Batteries of numerous types and construction have been known to the art for a long time. There are standard sized batteries (e.g. AAA, AA, C, D, 9 V, button, etc.), and non-standard sized batteries. There are primary type batteries, and secondary rechargeable type batteries. There are Leclanche type cells, alkaline cells, mercury cells, etc. Some of the batteries use a nail electrode, some use a carbon rod electrode, while others use foil. There are batteries which require activation. Activation may be via the use of movable mechanical means which provides relative motion between the electrode and electrolyte, by the introduction of electrolyte via the breaking of frangible means in the battery, or by other mechanisms. Some batteries have single cells, while other batteries have plural cells.

In the electronics age, our society is dependent upon numerous electronic apparatus which require electric power of one type or another. Many of the electronic apparatus which are widely used are portable, including cameras, watches, dictating equipment, computers, radios, toys, calculators, and hearing aids. Such portable electronic equipment requires batteries for operation, and typically uses batteries of standard sizes.

The battery powered apparatus cited above, among others, including those equipped with warning devices indicating remaining battery strength or depletion, all exhibit a common deficiency which limits their utility, the consumer satisfaction they deliver, and their market. That common deficiency is the tendency of the battery powered apparatus or system to fail (i.e. to cease to perform acceptably), when the battery reaches a critical point of depletion. This characteristic not only subjects the user to extreme inconvenience and frustration, which is not effectively eliminated by the use of battery testing devices, but it also requires the user to purchase and carry extra batteries of specific sizes if the user wishes to ensure reliable performance and avoid untimely battery and hence apparatus failure. In other words, unless the user is prepared to take inconvenient precautions, the user is subjected to the risk of failure at critically inconvenient moments of the equipment which is to be used. At those moments, the user may not have the ability, readily at hand, to reactivate the system quickly and conveniently.

Mechanical solutions to the problem have been scarce, and practical solutions are essentially non-existent. Portable battery testers have recently come into use which provide an indication of the relative charge of the battery. These testers, however, fail to provide the user of an indication as to how much life the battery has left vis-a-vis certain equipment. Moreover, it is not always convenient to use the tester to test the batteries in the equipment each time prior to taking the equipment on a trip. As a result, while helpful in certain circumstances, the battery testers fail to provide a mechanism whereby the frequent user of portable electronic equipment will not find himself in the frustrating circumstance of not being able to use portable electronic equipment due to lack of battery power.

Previous solutions have also failed to be effective. For example, in U.S. Pat. No. 3,486,944 to O'Donnell, a standard sized battery is disclosed as having an active cell and a reserve cell of apparently equal size. A terminal spacer conductor cap is placed over the reserve cell to provide electrical connection, with the reserve cell being out of the circuit. When the active cell is exhausted, the battery is rearranged by the user by dislodging the terminal spacer, sliding the cells out of a perimeter material, rearranging the cells so that the reserve cell replaces the active cell, and reinserting the terminal spacer appropriately. While the arrangement disclosed by O'Donnell may work to provide a reserve cell, it is impractical, as effectively O'Donnell is providing two separate cells in one package. Thus, the cost of the battery would effectively be twice ordinary battery. Moreover, by having two separate cells, volume is wasted, and the procedure for rearrangement is inconvenient. Further, since both cells are of equal size, the user is not provided any advantage over placing extra batteries in a sack or the like attached to the apparatus in which the batteries are needed. In other words, the O'Donnell battery does not provide effective solutions for the user of battery operated apparatus to the problem of batteries which are exhausted at a most inconvenient time.

SUMMARY OF THE INVENTION

It is therefore an object of the invention to provide a sealed battery having a reserve which can be activated upon failure of the battery to power electronic equipment.

It is another object of the invention to provide a sealed battery with a relatively large primary cell and a limited reserve which is easily activated upon the exhaustion of the primary cell and which will serve only as a one time back-up.

It is a further object of the invention to provide a sealed battery with a primary cell and a reserve which share components and together provide a battery life substantially similar in length to standard batteries.

An additional object of the invention is to provide a sealed battery having a primary cell and a reserve which is similar in cost to standard batteries and which can be used as an absolute replacement to standard batteries without redesign of the apparatus which the batteries power.

It is yet another object of the invention to provide sealed batteries having integral switches for activating reserves.

Even another object of the invention is to provide a sealed battery with a primary cell and a reserve cell which share one electrode, but which have separate, insulated counter-electrodes which are electrically connectable only via switching means.

In accord with the objects of the invention a sealed battery is provided and broadly comprises a cathode, first and second anodes separated by an insulator, first and second anode current collectors separated by the insulator, and a switch. The cathode is coupled to a positive terminal, while the first anode current collector is coupled to the first anode and to a negative terminal. The switch is used for connecting the second anode current collector and the second anode electrode to the negative terminal. Effectively, the cathode, first anode current collector, and first anode comprise a primary cell of a first size, and the cathode, second anode current collector, and second anode comprise a reserve cell which is typically substantially smaller in size and capacity than the primary cell. The anodes of the reserve and primary cells are electrically isolated by the insulator.

Many embodiments are provided. Preferably, in all of the embodiments the switch is internal and integral to the battery, and includes a bistable snap ring or other urging means, and a pin or nail which is mechanically coupled to the urging means. The pin or nail is arranged to pierce an insulator upon activation of the urging means and thereby establish electrical contact between the second anode current collector and the negative terminal. The insulator pierced by the pin or nail may be the insulator separating the anodes, or may be a second insulator especially provided for the switch. Activation of the urging means may be via squeezing the cell, via pressing a pen point or other small pointed object on the switch, or via other mechanisms or actions.

The battery invention applies to different types of cells. Thus, the battery may be a Leclanche cell, an alkaline cell, a mercury cell, a lithium cell, a cell having an inner cathode and an outer anode, or an inner anode and an outer cathode, etc. The battery invention envisions the use of an integral switch to activate either reserve anode material, reserve cathode material, or both. The basic cell design may be capacity-limited by the amount of anode material, by the amount of cathode material, or by both. Depending upon the type of cell utilized, the current collector may be a carbon rod, a metallic nail, a metallic foil, an HgO electrode, a metallic powder, or other electric conductor. Likewise, the anode and cathode materials may vary, as may the electrolyte.

The provided battery invention overcomes the deficiencies common to all other appliance-powering batteries by providing the user with a warning that the battery capacity is about to be exhausted, while at the same time giving the user the opportunity to extend the life of the battery for a reasonable additional period of time. The extension of battery life is obtained via a simple adjustment to the battery or batteries which activates the reserve power source which is integral to the battery of the invention. During the period of time in which the reserve power source restores and maintains the full function of the equipment being powered, the user has the opportunity at the user's convenience to obtain battery replacements. The invention, therefore, not only improves the performance of batteries and battery powered systems, but by increasing the reliability of such systems and the satisfaction they deliever, will tend to increase consumer reliance on such products and hence the size of the market for them.

Additional objects and advantages of the invention will become apparent to those skilled in the art upon reference to the detailed description taken in conjunction with the accompanying drawings.

BRIEF DESCRIPTION OF THE DRAWINGS

FIG. 1b is an enlarged schematic of the switch section of the battery of FIG. 1a;

DETAILED DESCRIPTION OF THE PREFERRED EMBODIMENTS

Figure 1A:
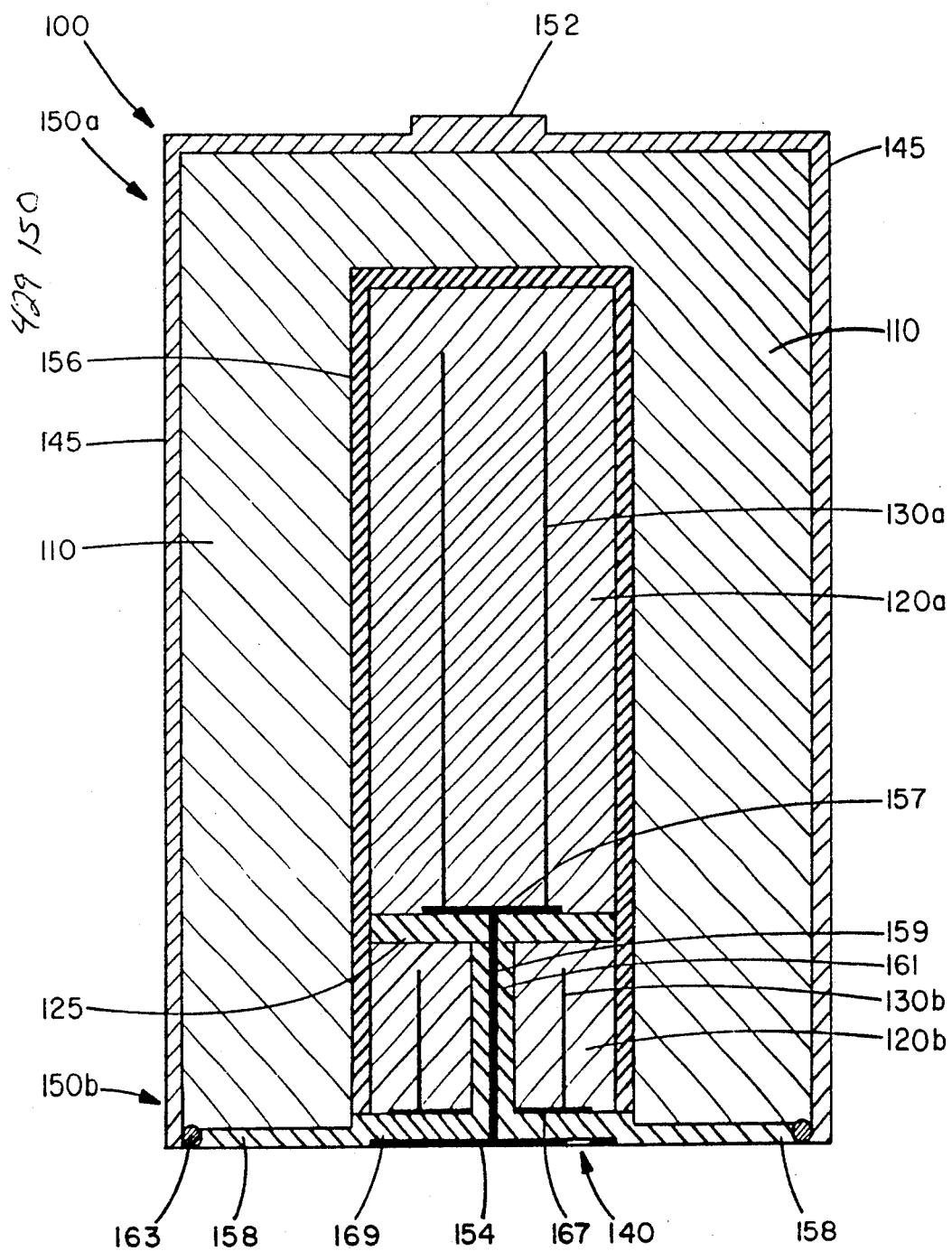
FIG. 1a is a cross-sectional view through the preferred sealed reserve type battery of the invention having an integral, internal switch.

Turning to FIG. 1a, a first sealed reserve type battery is seen and broadly includes a cathode 110, a first larger anode 120a, a second smaller anode 120b, an insulator 125 which separates the anodes 120, first anode current collector 130a, second anode current collector 130b, and a switch 140; all of which are encompassed by an outer jacket or seal 145 which is typically comprised of metal which is at least partially covered by plastic or paper. The cathode 110, together with the larger anode 120a and first current collector 130a provide a first or primary cell 150a, while the cathode 110, together with the smaller anode 120b and second current collector 130b provide a second or reserve cell 150b. The cathode, which may take many forms, (e.g. manganese dioxide ($MnO_2$) for an alkaline cell), is coupled to a first (positive) terminal 152, while the current collectors 130a and 130b, which may take different forms (e.g. foil) are coupled in a manner hereinafter described to a second (negative) terminal 154. The anodes 120a and 120b which may also take many forms, (e.g. powdered zinc (Zn) for an alkaline cell), extend around the current collectors 130a and 130b. As is common in primary type batteries, a permeable membrane 156 is located between the cathode 110 and the anode 120. The membrane 156 is chosen to permit the flow of ions from the anode to the cathode. While membrane 156 permits ionic flow, which is expedited by a typically aqueous electrolyte (not shown), insulator 125 is preferably chosen to limit leakage currents to a minimum. Also, as is common in primary type batteries, an insulating ring 158 is provided at the negative terminal end of the cathode 110 to prevent the cathode from becoming a short circuit path between terminals. A crimp 163 is also shown for sealing the battery after the contents of the battery are inserted into the jacket 145 during manufacture.

As seen in FIG. 1a, the current collector 130a of the primary cell 150a terminates in a conducting plate 157 which is connected to an electronically conducting post or wire 159. The post 159 extends through the insulator 125 which separates anode 120a from anode 120b, and connects directly to the negative terminal 154 which is preferably comprised of a metal plate. Also, as seen in FIG. 1a, the current collector 130b of the secondary or reserve cell 150b terminates in a conducting plate 167. Conducting plate 167 is not directly connected to the negative terminal 154, but is insulated therefrom by an insulating pad 169 which is also chosen to prevent leakage currents therethrough, and which may be integral with insulating ring 158 if desired. The only connection between current collectors 130b and the negative terminal 154 is through switch 140, as described with reference to FIG. 1b, as the post 159 makes electrical contact with both the conducting plate 157 and the negative terminal 154, but is otherwise insulated by insulator 161 along its length. If desired, insulator 161 may be integral with insulator 125 and/or insulating pad 169.

Figure 1B:
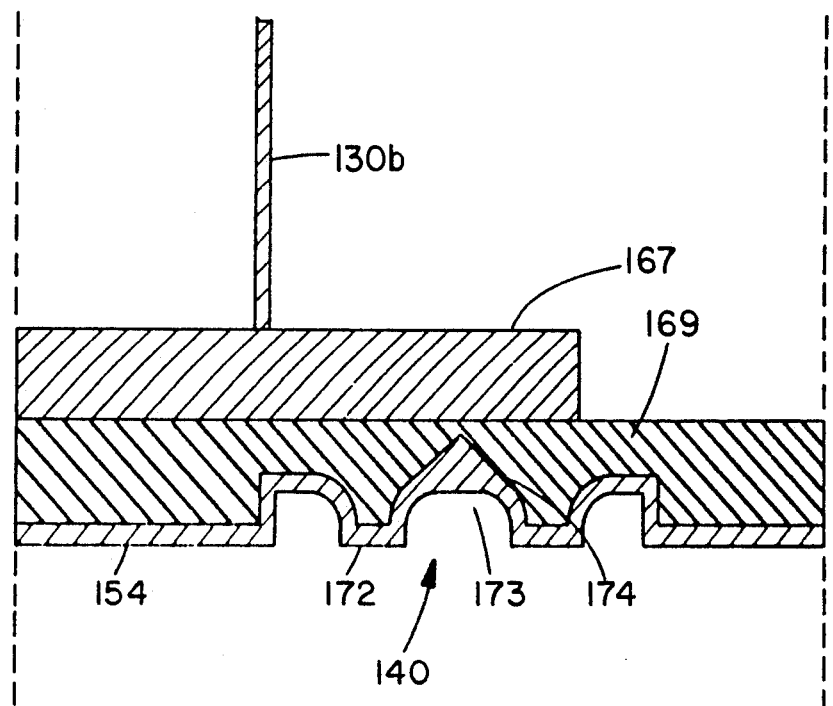

Turning to FIG. 1b, the switch 140 of FIG. 1a which is integral to the battery 100 is seen in some detail and comprises a bistable snap spring 172 with activation cut-out 173, and a pin 174 which is electrically coupled to the bistable snap spring 172. The bistable snap spring 172, in turn, is electrically coupled to the negative terminal 154. The pin 174 extends into the insulating pad 169 such that by activation of the snap spring 172 (such as by pressing a pen point into cut-out 173 while holding the battery 100 steady with two or more fingers), the spring snap forward and forces pin 174 through insulating pad 169 and into contact with conducting plate 167. In this manner, the reserve cell 150b is activated when desired. It will be appreciated that switch 140 is preferably located off-center so that the typical central contact location for the negative terminal 154 is not affected by the switch 140 or activation thereof. It will also be appreciated that the bistable snap spring 172 may be soldered or otherwise connected to the second terminal 154. Alternatively, the negative terminal 154 may be stamped and formed such that the spring 172 is integral with the negative terminal 154.

In use, when a load or resistance (not shown) is placed across terminals 152 and 154 of battery 100, ionic current is caused to flow across the membrane 156, between the cathode 110 and the first anode 120a. Before activation of the reserve cell, the current collector 130a withdraws electrons from anode 120a and passes the electrons to the conducting plate 157, and then through the conducting post 159 to the negative terminal 154. Little or no electronic or ionic current passes from the cathode 110 to the second anode 120b, as second anode 120b is not electrically connected to the negative terminal 154 because insulating pad 169 is blocking the connection. The electronic current provided by the larger cell 150a is thus available to the load, and after the electrons pass through the load they are received at the positive terminal 152 of the battery 110. After a period of time, when the capacity of the larger cell 150a has been exhausted, the equipment in which battery 100 is being used will malfunction or give some other indication that the battery 100 must be replaced. At that time, the user of battery 100 activates the reserve cell 150b by placing the tip of a ball-point pen, or some other pointed object at cut-out 173 of snap spring 172 and pressing. Pressing at cut-out 173 activates snap spring 172, which thrusts pin 174 through the insulating pad 169 and into contact with conductive plate 167 With current collector 130b now electrically connected to the second terminal 154 (via pin 174 and spring 172), the reserve cell 150b is able to provide additional current to whatever current the larger cell 150a can still provide. Thus, the user of the battery may continue to power the equipment until together the reserve cell 150b and larger cell 150a are inadequate to the task. At the same time, however, the user of the battery is given fair warning that the battery is about to be exhausted, and that at the next possible opportunity, the battery should be replaced.

It will be appreciated by those skilled in the art that by providing a substantially larger primary cell 150a compared to the reserve cell 150b, everything else being equal, the primary cell 150a will last nearly as long as an ordinary battery without a reserve. The reserve cell 150b, therefore, only provides a small additional life (which may be chosen as desired by the manufacturer) and functions to warn the user to the impending exhaustion of the battery. Functionally, this permits the user to avoid the frustrating situation of failing batteries.

It will further be appreciated that while, preferably, the primary cell 150a is substantially larger than the reserve cell 150b, in principle, there is no reason why the concepts of the invention could not apply to primary and reserve cells of different relative sizes. In fact, there may be situations where it is desirable to have the primary cell be the same size or smaller than the reserve.

Figure 2A:
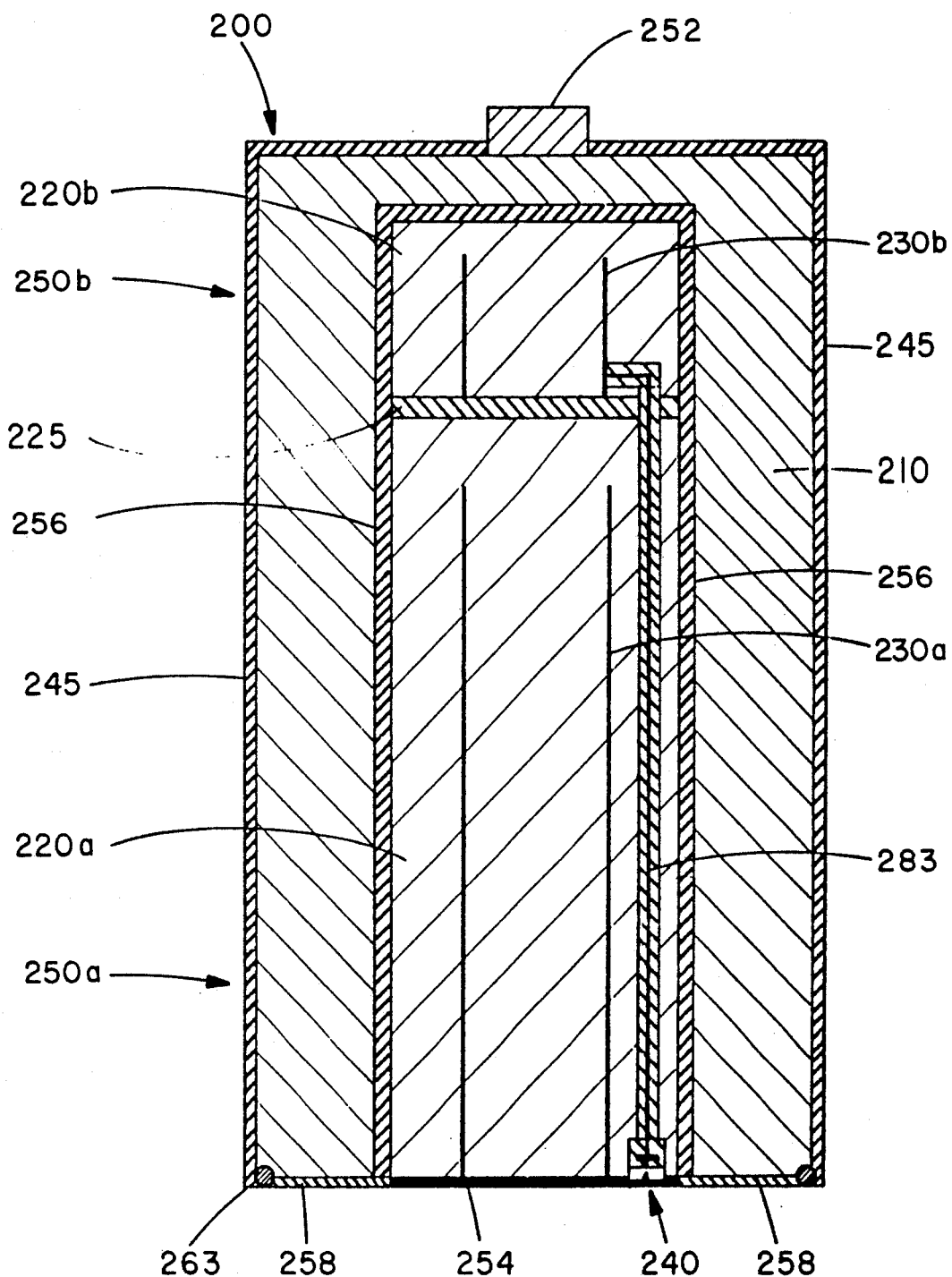
FIG. 2a is a cross-sectional view through a second embodiment of a sealed reserve type battery with the reserve located atop the primary cell.

Turning to FIG. 2a, a second embodiment of the battery invention 200 is seen. In FIG. 2a, parts which are identical or similar to parts of FIG. 1a are provided with similar numbers, except one hundred apart. Thus, battery 200 has a cathode 210, a larger and a smaller anode 220a and 220b which are separated by an insulator 225, a first anode current collector 230a, a second anode current collector 230b, a switch 240, and a seal 245. The cathode 210, larger anode 220a, and first anode current collector 230a provide a larger cell 250a, while the cathode 210, smaller anode 220b, and second anode current collector 230b provide a smaller reserve cell 250b. Cathode 210 is coupled to a positive terminal 252 and insulated from the negative terminal 254 by insulator 258. In the embodiment of battery 200, the first current collector 230a is directly connected to the negative terminal 254, while the second current collector 230b of the reserve cell 250b is coupled to the negative terminal 254 by switch 240 as described in more detail hereinafter. Because the reserve cell 250b of FIG. 2a is located atop the larger cell 250a (as opposed to the opposite relationship of the battery 100 of FIG. 1a), the current collector 230b of the reserve cell 250b is connected to switch 240 by an insulated conductor or wire 283 which extends from the electrode 230b through the insulator 225, and through the anode 220a of the larger cell 250a.

Figure 2B:
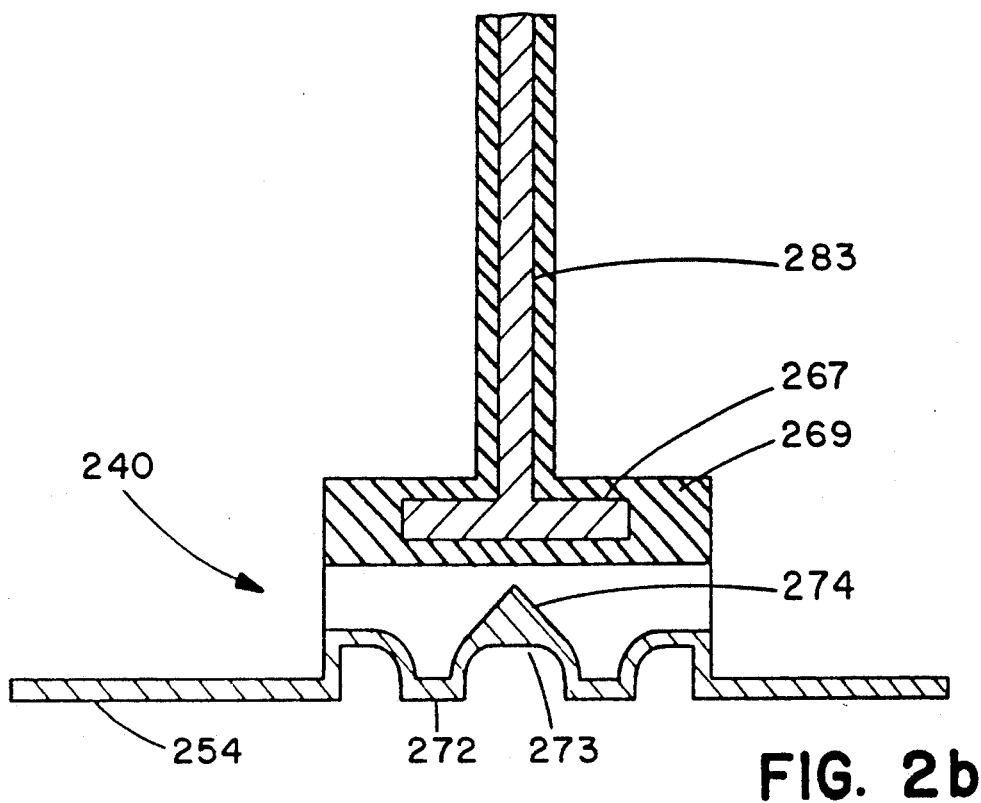
FIGS. 2b and 2c are enlarged schematics of the switch section of the battery of FIG. 2a, showing the switch before and after activation respectively.
Figure 2C:
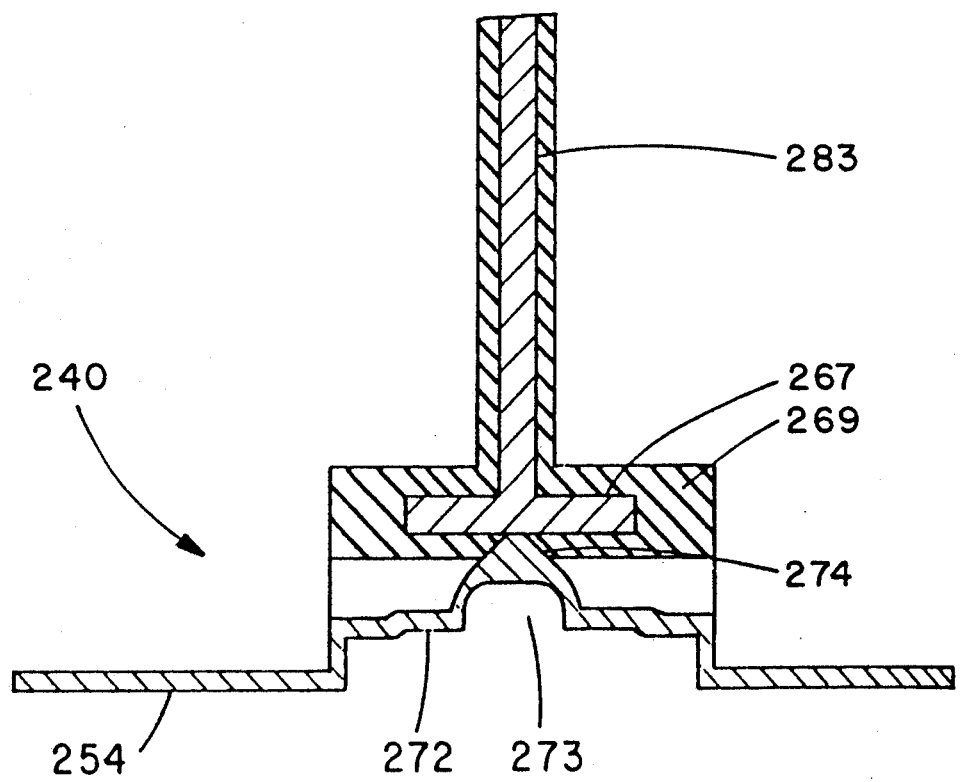

The switch 240 of the sealed reserve type battery 200 is seen in more detail in FIGS. 2b and 2c. As shown, switch 240 includes a bistable snap spring 272 having an activation cut-out 273, a pin 274 which is electrically connected to the snap spring 272, a conducting pad or plate 267 which is connected to insulated wire 283, and an insulating pad 269 which insulates the conducting pad or plate 267 from the first anode 220a as well as initially insulating the plate 267 from the pin 274. The snap spring 272 is electrically connected to the second terminal 254. As indicated in FIG. 2b, when snap spring 272 is in a first stable position (i.e. the reserve cell is not activated), the pin 274 does not contact the conducting plate 267, and hence electrodes 230b are not electrically coupled to the second terminal 254. However, as indicated in FIG. 2c, when the snap spring 272 is in a second stable position (i.e. the reserve cell is activated), pin 274 contacts conducting plate, and the current collector 230b is electrically coupled to the negative terminal 254 via wire 283 and conducting plate 267. If desired, in order to expedite the passage of the pin 274 through the insulating pad 269, the insulating pad 269 may effectively include two sections; a first more rigid section substantially surrounding the conducting plate 267, and a second softer section which is located between the pin 274 and the conducting plate 267.

Figure 3A:
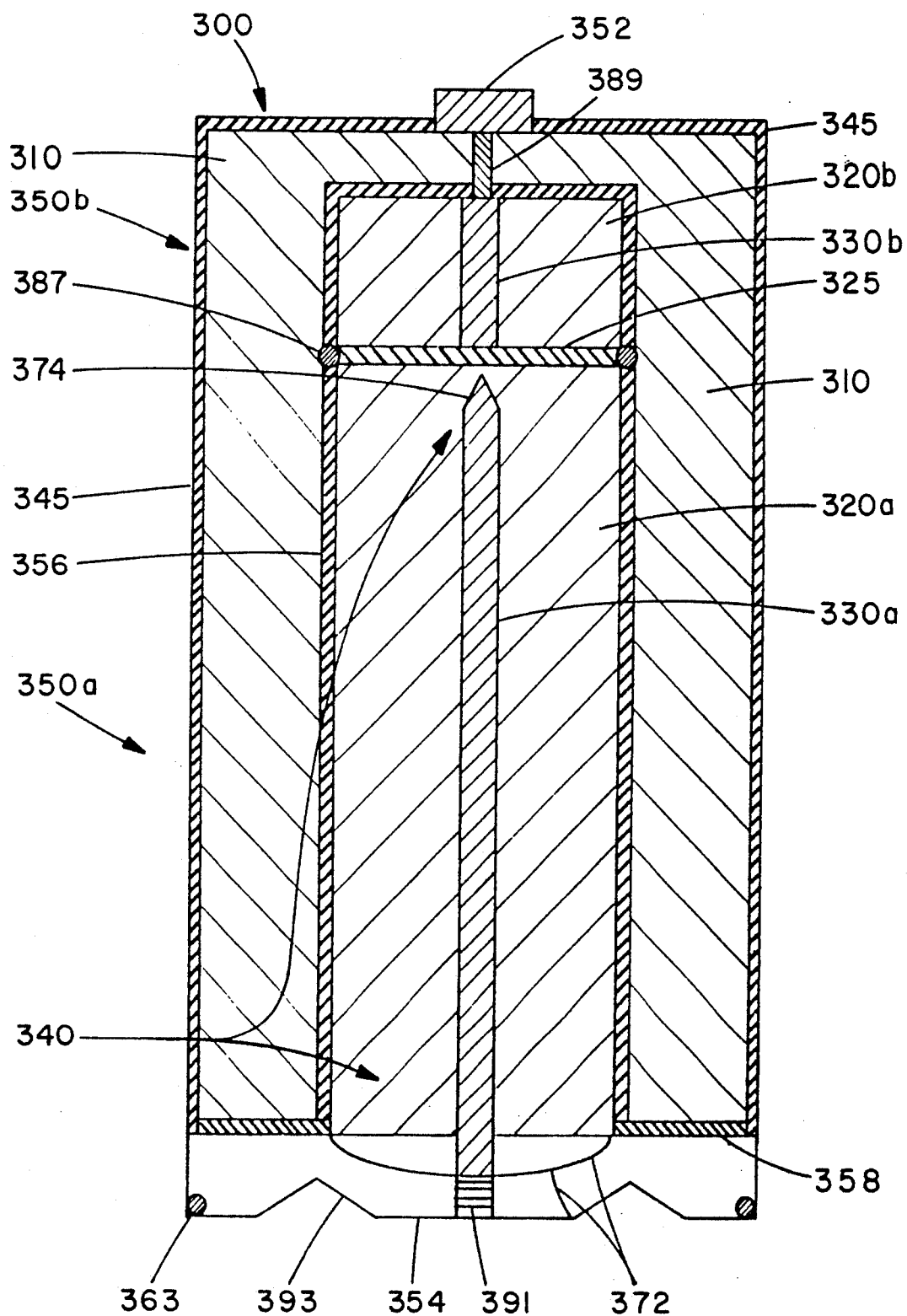
FIGS. 3a, 3b, and 3c are cross-sectional views through a third embodiment of a sealed reserve type battery in respectively its initial configuration, its compressed configuration obtained during activation of the reserve, and its final configuration.
Figure 3B:
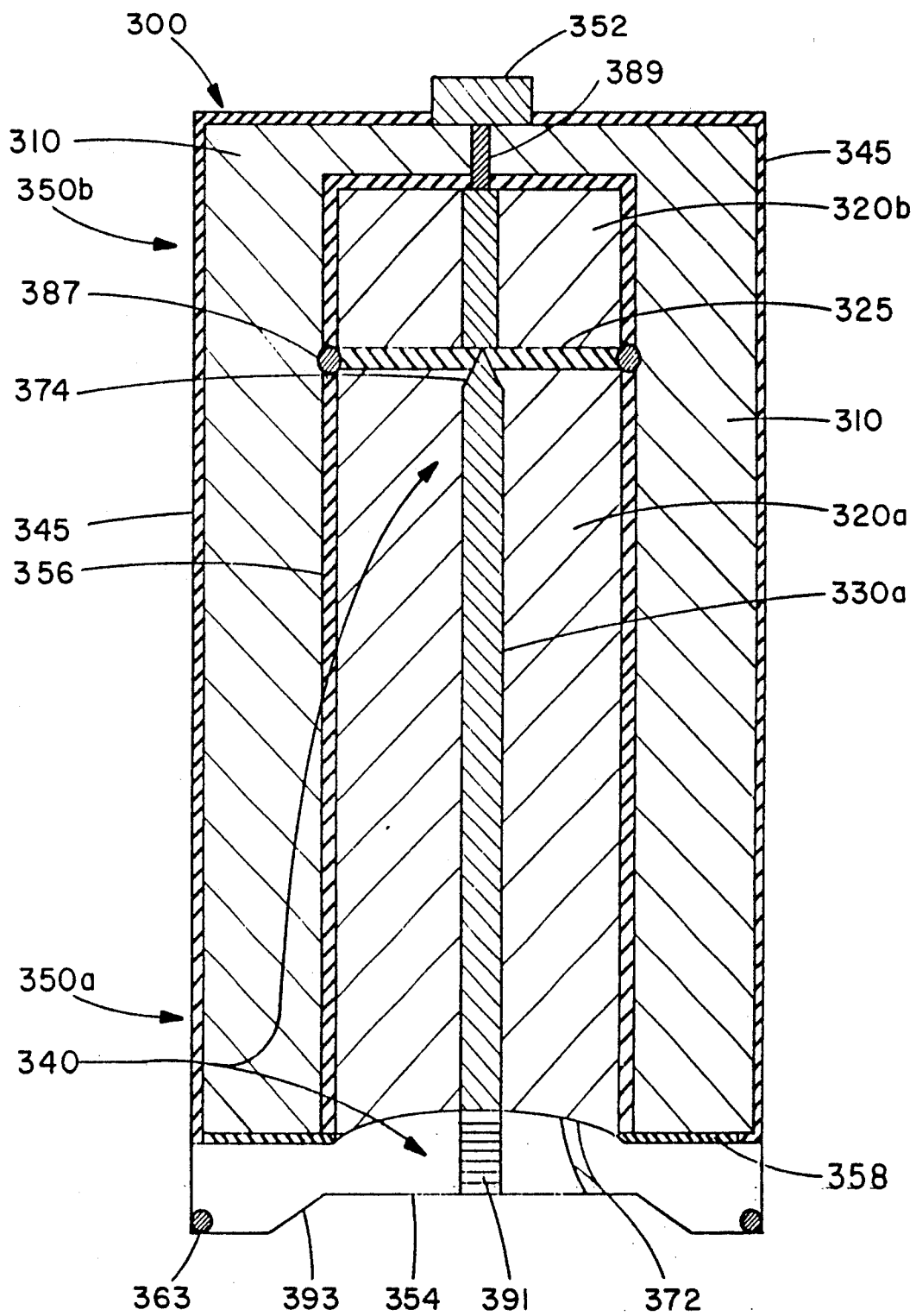
Figure 3C:
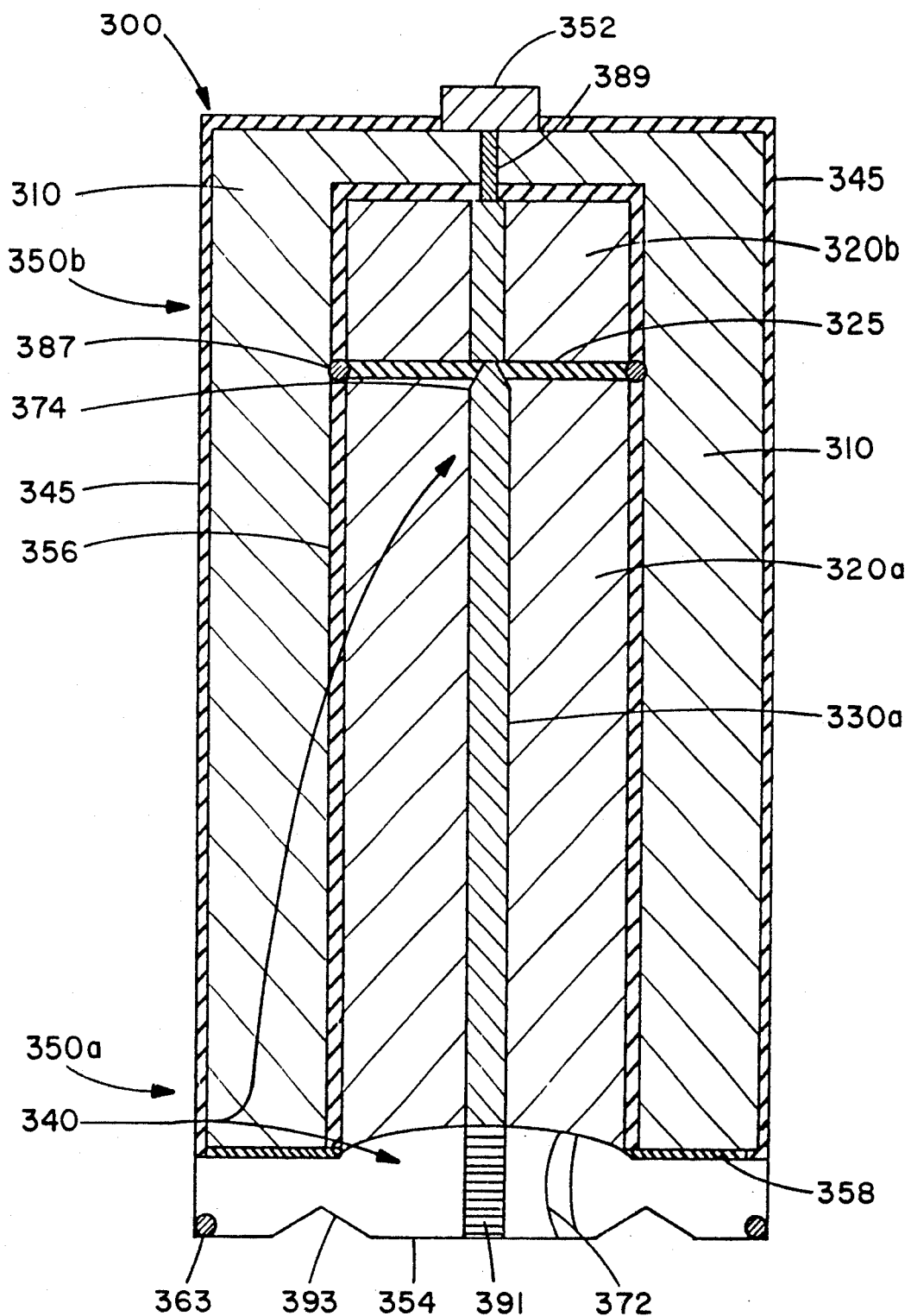

Before turning to FIGS. 3a-3c, it should be noted that while the embodiments of FIGS. 1a, 1b, and 2a-2c show batteries with an arrangement of an outer cathode and an inner anode, with a current collector located in the anode, and with the cathode connected to the top (positive) terminal and the anode connected to the bottom (negative) terminal, the shown embodiments are intended to be representative only, as the invention clearly extends to batteries of all arrangements. For example, simply by switching the anodic material of the embodiments of FIGS. 1 and 2 with the cathodic material of those embodiments while leaving the current collectors in place, a reverse polarity battery having two cathodes and a single anode is provided according to the invention. If standard polarity is desired, minor design modifications which could include one or more of moving the location of the switch, modifying the arrangement of the insulators, modifying the exact locations of the cathodic and anodic materials, etc., can easily be made.

In a slightly different manner, the entire inner structure, including the two anodes, the current collectors, and the insulators and plates can be moved to the outside, while the cathode can be moved inward. With the outer anodes having the current collectors, and an inner cathode, only minor design changes would be needed from what is shown in FIGS. 1 and 2; e.g. the insulators separating the anode and cathode from the terminals would be modified, etc. Again, if different polarity is desired, additional minor design modifications can accommodate a change in polarity.

Turning to FIGS. 3a-3c, a third embodiment of the invention is seen where a sealed, reserve, nail-electrode battery 300 is provided. Battery 300 includes a cathode 310, a first larger anode 320a and a second reserve anode 320b separated by an insulator 325, first and second current collector nails 330a, 330b, and a switch mechanism 340, all encased in a seal 345. Together, the cathode 310, the first larger anode 320a, and the first nail 330a comprise a first larger or primary cell 350a, while the cathode 310, second anode 320b, and second electrode nail comprise a second reserve cell 350b. As shown in FIGS. 3a-3c, the cathode 310 is connected to the positive terminal 352, While anode 330a is connected to the negative terminal 354. An insulating ring 358 is provided to prevent a short circuit from positive terminal 352 to negative terminal 354 through the cathode 310. Also shown is crimp 363.

Because the reserve of battery 300 is activated by mechanical deformation of the battery 300 as discussed hereinafter, the battery preferably includes mechanical supports for various of its elements. For example, as indicated in FIGS. 3a-3c, a clamp ring 387 is preferably provided to hold insulator 325 in place during activation of the reserve cell 350b. Also, preferably, another insulator 389 which mechanically couples the second nail 330b and the positive terminal 352 is provided to hold the second nail 330b in place. Insulator 389 itself is held in place by the cathode 310.

The switch mechanism 340 of reserve type battery 300 includes a bistable snap spring 372 which is electrically connected to the negative terminal 354 as well as a pointed section 374 of the first nail 330a. An additional coil spring 391 coupled to the bottom of the nail 330a is also preferably provided for stability. Also, the bottom of the battery 300 is preferably formed with indents 393 which permit the bottom to be resiliently deformed as discussed hereinafter with reference to the activation of the reserve cell.

In operation, during regular use, when a load is placed across terminals 352 and 354, ionic current flows from the anode 320, across a membrane 356, into the cathode 310 of the larger cell 350a. The electron current is conducted by the snap-spring 372 to the negative terminal 354 which powers the load (not shown). Electron current returns to the cathode via terminal 352. Because no electronic path is provided from the current collector nail 330b of the reserve cell to the negative terminal 372, the reserve cell is not in use. When the capacity of the larger cell 350a is substantially exhausted and the battery is no longer capable of powering the load, the reserve cell 350b is activated by squeezing the terminal ends of the battery 300 such that the battery assumes the configuration shown in FIG. 3b. As seen in FIG. 3b, the squeezing action causes the bistable snap spring 372 to assume a second stable position so as to thrust the tip or pin 374 of the current collector nail 330a through the insulator 325 and into contact with the current collector nail 330b of the reserve cell 350b. After squeezing is terminated, the battery 300 takes the configuration as shown in FIG. 3c. Due to the resilient nature of the bottom portion of the battery with indents 393, the bottom portion reassumes its normal position. However, tho bistable spring maintains its forward position and holds nail 330a in contact with nail 330b. The extra coil spring 391 also helps hold the current collector nail 330a in contact with the reserve current collector nail 330b by expanding.

With nail 330a in contact with nail 330b of the reserve cell 350b, the reserve cell 350b is activated. Ionic current flows from the anode 320b, across membrane 356, and into the cathode. The current collector nail 330b conducts electron current to nail 330a, through the bistable spring 372 and to the negative terminal 354. At the same time, to the extent that it is functioning, the larger cell 350a provides additional power in the same manner as it did previous to the activation of the reserve cell. Thus, once the reserve cell 350b has been activated, battery 300 effectively functions as a typical standard nail type battery, as the two nails 330a and 330b effectively become a single current collector nail.

Figure 4A:
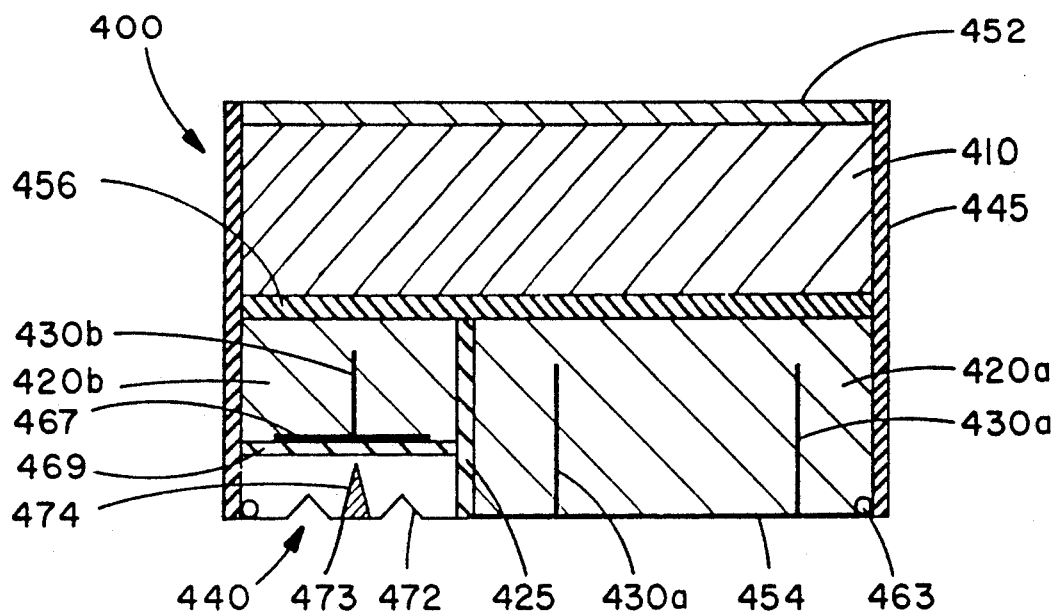
FIGS. 4a and 4b are cross-sectional and bottom schematic views of a sealed reserve type button battery.
Figure 4B:
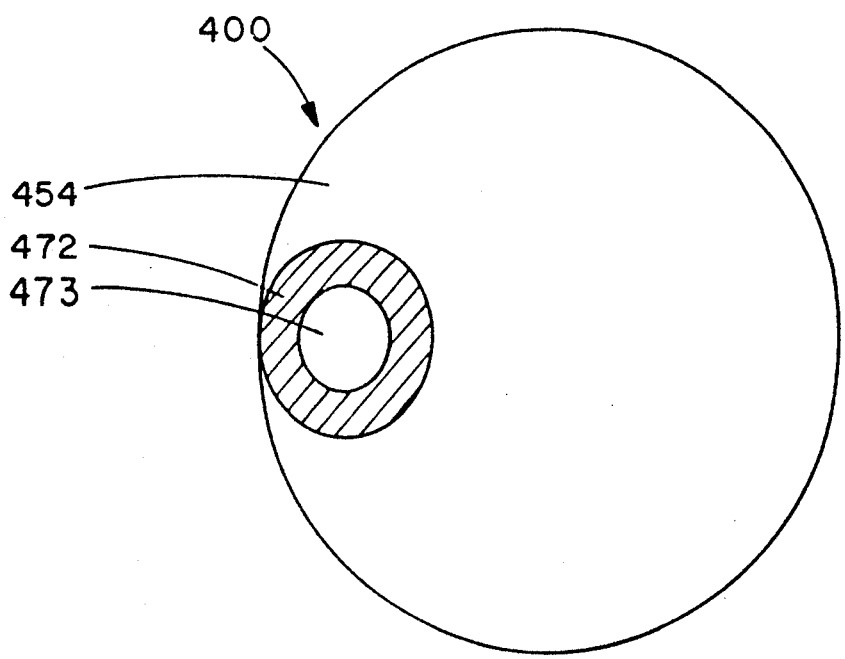

A sealed "button" or coin-type battery 400 according to the invention is seen in FIGS. 4a and 4b. Battery 400 may be a mercury type battery which is typically used in cameras, watches, hearing aids etc., and which uses a HgO cathode, a Zn anode, and aqueous KOH as an electrolyte. Battery 400 includes a cathode 410, a first larger anode 420a, a smaller reserve anode 420b, first and second current collectors 430a and 430b, and a switch 440; all of which are sealed by seal 445. The cathode 410 is coupled to a positive terminal 452, while the first current collector 430a is coupled to a negative terminal 454. The second current collector 430b is coupled to the negative terminal 454 via switch 440 as hereinafter described. The anodes 420a and 420b are separated by a membrane 456 from the cathode 410. In addition, the anodes 420a and 420b are separated from each other by an insulator 425. In order to prevent electrical shorting between the terminals 452 and 454 by the seal 445, an additional insulator (not shown) may be provided around the anodic material. Alternatively, seal 445 may be non-conducting.

As indicated in FIGS. 4a and 4b, the switch 440 includes a snap ring 472 with an activation area 473 (which may be formed from the second terminal 454 if desired), a pin 474 which is mechanically coupled and electrically connected to the snap ring 472, an insulator 469 and a metal plate 467. The metal plate is coupled to the second current collector 430b. When the activation section 473 of the snap ring 472 is pushed, the pin 474 pierces the insulator 469 and contacts the metal plate 467; thereby causing the second current collector 420b to be electronically coupled to the negative terminal 454.

In use, the button battery 400 functions almost identically to the battery of FIGS. 1a, 1b, and 2a-2c.

It will be appreciated by those skilled in the art that because mercury type batteries as shown in FIGS. 4a-4b typically have an active life of a year or more, that any reserve cell for a mercury type battery will probably supply several weeks of reserve. This situation is fortunate, as mercury type batteries are often used for such indispensible items such as hearing aids and watches, and a reserve of several weeks will accommodate travellers on long trips.

Figure 5:
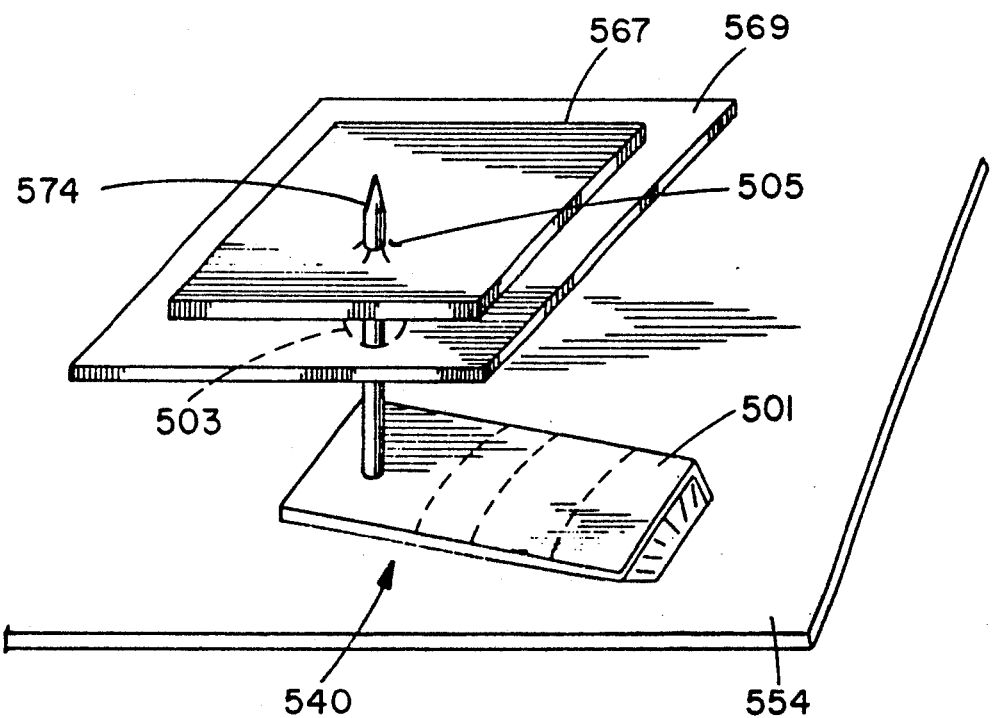
FIG. 5 is a schematic of an alternative switch which can be used with any of the preferred embodiments.

As previously mentioned, different types of switch mechanisms can be utilized in accord with the invention. The parameters in designing a switch for incorporation into the battery are that the switch should be inexpensive to manufacture, that the switch should provide a reliable contact (permanent in the case of primary batteries, and reversible in the case of secondary batteries), and that the switch can be incorporated into the battery and activated without breaking the seal of the battery. As seen in FIG. 5, an alternate switch 540 is shown. Switch 540 includes a very flexible counterlever strip 501 which has one end coupled (e.g. by welding) to the bottom terminal of the battery and a second free end, a nail or pin 574 coupled to the free end of the strip 501, an insulator 569 which may have a hole 503 extending therethrough, and a conductive plate 567 having a punched hole or crack 505. Switch 540 does not require a snap ring. Rather, upon pressing the bottom terminal at the location of the free end of the flexible strip 501, the nail or pin 574 is pushed either through the hole 503 in the insulator 569, or through the insulator 569 itself, and up into the punched hole or crack 505 in the conductive plate 567. The force of pushing the nail or pin 574 into the crack 505 of the conductive plate 567 causes the plate to be punctured even more such that the torn metal of the plate 567 not only cleans the nail or pin 574 to provide a good electrical connection, but holds (i.e. locks) the nail or pin 574 in position when the bottom terminal 554 is released.

There have been described and illustrated herein sealed reserve type batteries. While particular embodiments have been described, it is not intended that the invention be limited thereby, as it is intended that the invention be as broad in scope as the art will allow. Thus, while the invention has been described with reference to primary type batteries, it will be appreciated that the invention applies to secondary type (i.e. rechargeable) batteries. All that is required is that the switch mechanism be reversable, so that the reserve cell can be deactivated as well as activated. This would suggest that the use of switch mechanisms such as shown in FIGS. 1a, 1b, and 2a-2c as opposed to that of FIGS. 3a-3c and 5, with the addition of an insulator which is not destroyed during switch activation such as an air or liquid insulator, or an automatically resealing insulator. Further, while most of the disclosed embodiments were alkaline or mercury type batteries, it will be appreciated that the invention also applies to other types of batteries, including by way of example and not limitation, Leclanche, lead-acid, and lithium cells, and 9 V batteries. Also, while particular type switching mechanisms were disclosed, it will be appreciated that other types of switches could be utilized. All that is required is that the switch be easily operable either through hand manipulation or by use of a common, handy object. In fact, it will also be appreciated that the switch mechanism need not be located on the bottom of the battery, but with minor design modification, can be located on the side or on the top of the battery. The switch design and location can be arranged such that the reserve of the battery can be activated without opening the powered apparatus or battery compartment thereof, provided that the powered apparatus or battery compartment is appropriately designed. Further, while the embodiments of the invention were disclosed as using insulators between the primary anode and the reserve anode, as well as insulators in the switch mechanism, it will be appreciated that insulation (i.e. complete isolation) is desirable but not necessary, and that small leakage currents can be tolerated. What is required is that there be good enough isolation between the main and the reserve material such that the output voltage of the larger cell drops off significantly before undesirable amounts of the reserve materials are used up.

Further yet, those skilled in the art will recognize that the principles set forth by the battery invention disclosed herein may be extended in numerous ways. For example, a battery having multiple reserve cells with separate switches is easily accomplished. Also, while not preferred, a battery where both the anode and cathode are divided into primary and reserve portions is easily accomplished. Moreover, as previously mentioned, using the teachings of the invention, reverse polarity batteries, batteries with two cathodes and a single anode, and batteries with an outer cathode or cathodes and an inner anode or anodes are easily obtained with minor design modifications. Additional design modifications, where aspects of one of the shown embodiments are combined with other aspects of another shown embodiment will also suggest themselves to those skilled in the art. For example, the side by side arrangement of the primary and reserve anodes of the button type battery of FIGS. 4a and 4b can easily be applied to the concepts shown in FIGS. 1a, 1b, and 2a-2c. Therefore, it will be apparent to those skilled in the art that yet additional changes and modifications may be made to the invention as described without departing from the scope and spirit of the invention as set forth in the claims.

We claim:

1. A sealed battery, comprising:
   a) cathodic and anodic materials in proximity with each other, with at least one of said cathodic and anodic materials being divided into primary and reserve portions;
   b) isolation means for isolating said primary and reserve portions;
   c) first and second current collecting means located in said primary and reserve portions respectively, and separated by said isolation means;
   d) integral switch means coupled to said second current collecting means;
   e) first and second terminals, wherein one of said cathodic and anodic materials is coupled to said first terminal, the other of said cathodic and anodic materials is coupled to said second terminal, said first current collecting means is coupled to said second terminal, and said second current collecting means is switchably coupled via said switch means to said second terminal;

f) an electrolyte located in said cathodic and anodic materials; and g) a membrane through which ions can flow, said membrane separating said cathodic and anodic materials, wherein said switch means comprises urging means, pin means electrically coupled to said second terminal and mechanically coupled to said urging means, conducting means coupled to said second current collecting means, and isolating means between said pin means and conducting means, said urging means, upon activation, urging said pin means into contact with said conducting means so as to provide an electrical coupling of said second current collecting means and said second terminal.

2. A sealed battery according to claim 1, wherein:
said urging means is a conductive bistable snap ring, and electrically couples said pin means to said second terminal.

3. A sealed battery according to claim 1, further comprising:

h) insulated conductive means for electrically coupling said first current collecting means to said second terminal means while extending through said isolation means and said reserve portion.

4. A sealed battery according to claim 3, further comprising:

h) insulated conductive means for electrically coupling said second current collecting means to said conducting means of said switch means while extending through said isolation means and said primary portion.

5. A sealed battery, comprising:

a) cathodic and anodic materials in proximity with each other, with said anodic material being divided into primary and reserve portions;

b) isolation means for isolating said primary and reserve portions;

c) first and second current collecting means located in said primary and reserve portions of said anodic material respectively, and separated by said isolation means;

d) integral switch means coupled to said second current collecting means;

e) first and second terminals, wherein one of said cathodic and anodic materials is coupled to said first terminal, the other of said cathodic and anodic materials is coupled to said second terminal, said first current collecting means is coupled to said second terminal, and said second current collecting means is switchably coupled via said switch means to said second terminal, wherein said primary portion of said anodic material, said cathodic material, and said first current collecting means comprise a primary cell, and said reserve portion of said anodic material, said cathodic material, and said second current collecting means comprise a reserve cell.

6. A sealed battery according to claim 5, wherein:
said primary portion is substantially larger than said reserve portion.

7. A sealed battery according to claim 5, wherein:
said cathodic material extends around said anodic material, and said sealed battery further comprises second isolation means for isolating said cathodic material from one of said first and second terminals.

8. A sealed battery according to claim 1, wherein:
said anodic material is divided into primary and reserve portions, said primary portion being substantially larger than said reserve portion, said primary portion of said anodic material, said cathodic material, and said first current collecting means comprise a primary cell, and said reserve portion of said anodic material, said cathodic material, and said second current collecting means comprise a reserve cell of substantially smaller size than said primary cell.

9. A sealed battery according to claim 8, wherein:
said cathodic material extends around said anodic material, and said sealed battery further comprises second isolation means for isolating said cathodic material from one of said first and second terminals.

10. A sealed battery according to claim 1, wherein:
said switch means is eccentrically located adjacent said second terminal.

11. A sealed battery according to claim 1, wherein:
said cathodic material is divided into primary and reserve portions, said primary portion of said cathodic material, said anodic material, and said first current collecting means comprise a primary cell, and said reserve portion of said cathodic material, said anodic material, and said second current collecting means comprise a reserve cell.

12. A sealed battery according to claim 11, wherein:
said primary portion is substantially larger than said reserve portion.

13. A sealed battery according to claim 11, wherein:
said anodic material extends around said cathodic material, and said sealed battery further comprises second isolation means for isolating said anodic material from one of said first and second terminals.

14. A sealed battery comprising:

a) cathodic and anodic materials in proximity with each other, with at least one of said cathodic and anodic materials being divided into primary and reserve portions;

b) isolation means for isolating said primary and reserve portions;

c) first and second current collecting means located in said primary and reserve portions respectively, and separated by said isolation means;

d) integral switch means coupled to said second current collecting means;

e) first and second terminals, wherein one of said cathodic and anodic materials is coupled to said first terminal, the other of said cathodic and anodic materials is coupled to said second terminal, said first current collecting means is coupled to said second terminal, and said second current collecting means is switchably coupled via said switch means to said second terminal, wherein, said switch means comprises urging means, pin means electrically coupled to said first electrode and mechanically coupled to said urging means, said urging means, upon activation, urges said pin means through said isolation means and into contact with said second current collecting means so as to provide an electrical coupling of said second current collecting means and said second terminal.

15. A sealed battery according to claim 14, wherein:

said pin means extends from the top of said first current collecting means,
said urging means is connected to the bottom of said first current collecting means.

16. A sealed battery according to claim 15, wherein:
said anodic material is divided into primary and reserve portions,
said primary portion of said anodic material, said cathodic material, and said first current collecting means comprise a primary cell, and
said reserve portion of said anodic material, said cathodic material, and said second current collecting means comprise a reserve cell,
said primary portion is substantially larger than said reserve portion, and
said cathodic material extends around said anodic material, and said sealed battery further comprises second isolation means for isolating said cathodic material from one of said first and second terminals.

17. A sealed battery according to claim 1, wherein:
one of said cathodic and anodic materials is located atop the other of said cathodic and anodic materials, and
said primary portion is substantially larger than said reserve portion.

18. A method for reactivating a partially spent sealed battery, said sealed battery having cathodic and anodic materials in proximity with each other, with at least one of said cathodic and anodic materials being divided by isolation means into primary and reserve portions, first and second current collecting means located in said primary and reserve portions respectively and separated by said isolation means, integral switch means coupled to said second current collecting means, and first and second terminals, wherein one of said cathodic and anodic materials is coupled to said first terminal, the other of said cathodic and anodic materials is coupled to said second terminal, said first current collecting means is coupled to said second terminal, and said second current collecting means is switchably coupled via said switch means to said second terminal, the method comprising:
 a) grasping said partially spent sealed battery with at least two fingers; and
 b) applying pressure with a small-ended object to a surface of said sealed battery at which said integral switch means is located in a manner perpendicular to said surface, to cause said switch means to couple said second current collecting means to said second terminal.

19. A sealed battery, comprising:
 a) cathodic and anodic materials in proximity with each other, with at least one of said cathodic and anodic materials being divided into primary and reserve portions, wherein said primary portion is substantially larger than said reserve portion;
 b) isolation means for isolating said primary and reserve portions;
 c) first and second current collecting means located in said primary and reserve portions respectively, and separated by said isolation means;
 d) integral switch means coupled to said second current collecting means; and
 e) first and second terminals, wherein one of said cathodic and anodic materials is coupled to said first terminal, the other of said cathodic and anodic materials is coupled to said second terminal, said first current collecting means is coupled to said second terminal, and said second current collecting means is switchably coupled via said switch means to said second terminal.

20. A sealed battery according to claim 19, wherein:
one of said anodic and cathodic materials is divided into primary and reserve portions, and the other of said anodic and cathodic materials is undivided.

21. A sealed battery according to claim 19, further comprising:
 f) an electrolyte located in said cathodic and anodic materials; and
 g) a membrane through which ions can flow, said membrane separating said cathodic and anodic materials, wherein
  said switch means comprises urging means, pin means electrically coupled to said second terminal and mechanically coupled to said urging means, conducting means coupled to said second current collecting means, and isolating means between said pin means and conducting means,
  said urging means, upon activation, urging said pin means into contact with said conducting means so as to provide an electrical coupling of said second current collecting means and said second terminal.

22. A sealed battery according to claim 19, wherein:
said anodic material is divided into primary and reserve portions,
said primary portion of said anodic material, said cathodic material, and said first current collecting means comprise a primary cell, and
said reserve portion of said anodic material, said cathodic material, and said second current collecting means comprise a reserve cell.

23. A sealed battery according to claim 19, wherein:
said cathodic material extends around said anodic material, and said sealed battery further comprises second isolation means for isolating said cathodic material from one of said first and second terminals.

24. A sealed battery according to claim 19, wherein:
said anodic material is divided into primary and reserve portions,
said primary portion of said anodic material, said cathodic material, and said first current collecting means comprise a primary cell, and
said reserve portion of said anodic material, said cathodic material, and said second current collecting means comprise a reserve cell of substantially smaller size than said primary cell.

25. A sealed battery according to claim 24, wherein:
said cathodic material extends around said anodic material, and said sealed battery further comprises second isolation means for isolating said cathodic material from one of said first and second terminals.

26. A sealed battery, comprising:
 a) cathodic and anodic materials in proximity with each other, with at least one of said cathodic and anodic materials being divided into primary and reserve portions, said primary and reserve portions being substantially coaxial with and either surrounding or surrounded by the other of said cathodic and anodic materials;
 b) isolation means for isolating said primary and reserve portions from each other;

c) first and second current collecting means located in said primary and reserve portions respectively, and separated by said isolation means;

d) integral switch means coupled to said second current collecting means; and e) first and second terminals, wherein one of said cathodic and anodic materials is coupled to said first terminal, the other of said cathodic and anodic materials is coupled to said second terminal, said first current collecting means is coupled to said second terminal, and said second current collecting means is switchably coupled via said switch means to said second terminal.

27. A sealed battery according to claim 26, further comprising:

f) an electrolyte located in said cathodic and anodic materials; and g) a membrane through which ions can flow, said membrane separating said cathodic and anodic materials, wherein, said switch means comprises urging means, pin means electrically coupled to said second terminal and mechanically coupled to said urging means, conducting means coupled to said second current collecting means, and isolating means between said pin means and conducting means, said urging means, upon activation, urging said pin means into contact with said conducting means so as to provide an electrical coupling of said second current collecting means and said second terminal.

28. A sealed battery according to claim 26, wherein:
said anodic material is divided into primary and reserve portions,
said primary portion of said anodic material, said cathodic material, and said first current collecting means comprise a primary cell, and
said reserve portion of said anodic material, said cathodic material, and said second current collecting means comprise a reserve cell, and
said primary portion is substantially larger than said reserve portion.

29. A sealed battery according to claim 26, wherein:
said cathodic material extends around said anodic material, and said sealed battery further comprises second isolation means for isolating said cathodic material from one of said first and second terminals.

30. A sealed battery according to claim 26, wherein:
said anodic material is divided into primary and reserve portions, said primary portion being substantially larger than said reserve portion,
said primary portion of said anodic material, said cathodic material, and said first current collecting means comprise a primary cell, and
said reserve portion of said anodic material, said cathodic material, and said second current collecting means comprise a reserve cell of substantially smaller size than said primary cell.

31. A sealed battery according to claim 30, wherein:
said cathodic material extends around said anodic material, and said sealed battery further comprises second isolation means for isolating said cathodic material from one of said first and second terminals.

* * * * *